United States Patent [19]

Tarrillo

[11] Patent Number: 4,926,098
[45] Date of Patent: May 15, 1990

[54] PUSH-PULL CLASS-E BI-DIRECTIONAL SCANNING CIRCUIT

[75] Inventor: Albert G. Tarrillo, Cincinnati, Ohio
[73] Assignee: Zenith Electronics Corporation, Glenview, Ill.
[21] Appl. No.: 409,554
[22] Filed: Sep. 19, 1989
[51] Int. Cl.⁵ .................... H01J 29/70; H01J 29/76
[52] U.S. Cl. ............................ 315/408; 315/397
[58] Field of Search ........................ 315/408, 397

[56] References Cited

U.S. PATENT DOCUMENTS 3,939,380  2/1976  Peer ............................ 315/397
4,288,738  9/1981  Rogers et al. .................... 315/411

Primary Examiner—Theodore M. Blum

[57] ABSTRACT

A bi-directional scanning system for a CRT is disclosed comprising: a vertical CRT deflection coil, a horizontal CRT deflection coil; two class-E switchmode amplifiers which are connected in a push-pull arrangement to convert a positive DC voltage and a negative DC voltage to a generally sinusoidal current for operating the horizontal CRT deflection coil; and a staircase voltage generator for operating the vertical CRT deflection coil.

22 Claims, 3 Drawing Sheets

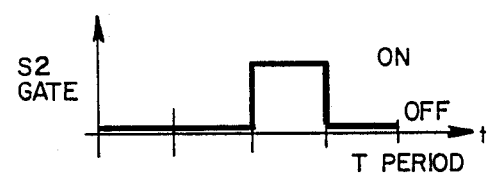
FIG. 5E
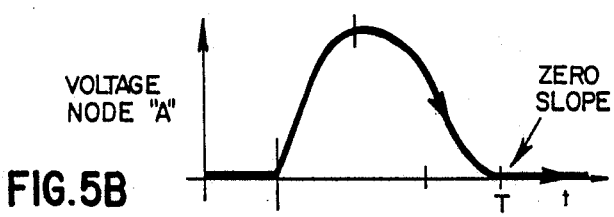
FIG. 5A
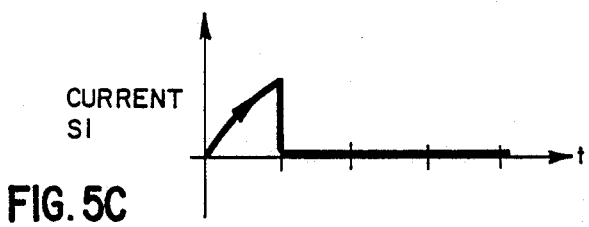
FIG. 5B
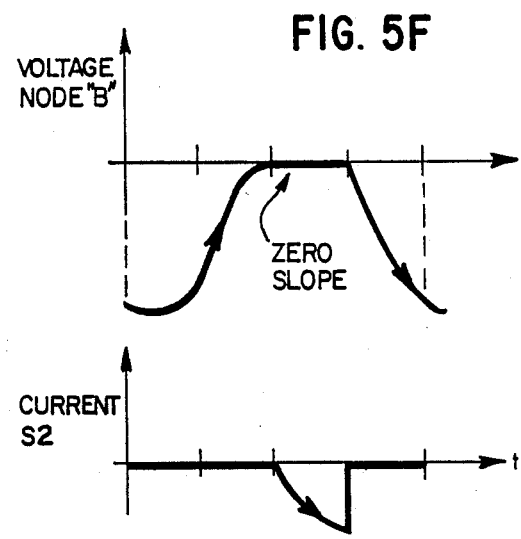
FIG. 5F
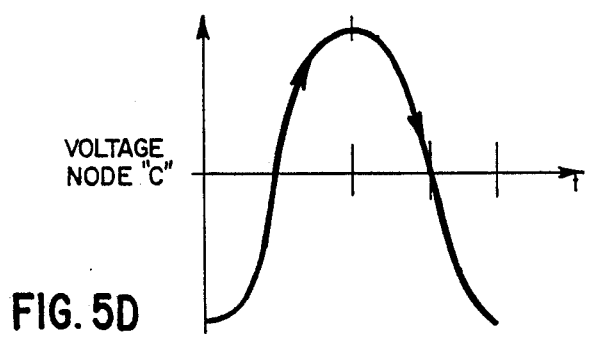
FIG. 5C
FIG. 5D
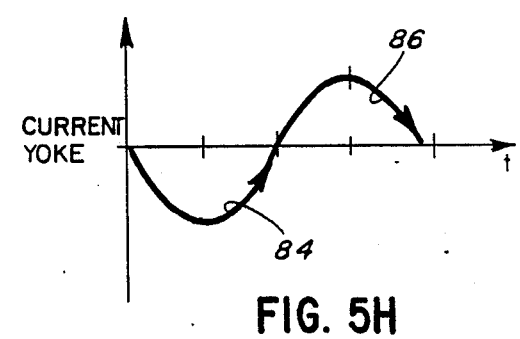
FIG. 5G
FIG. 5H

PUSH-PULL CLASS-E BI-DIRECTIONAL SCANNING CIRCUIT

Technical Field

This invention relates generally to scanning systems for cathode ray tubes and particularly to a linear bi-directional scanning system.

Background of the Invention

Conventionally, a cathode ray tube (CRT) has a target area consisting of a phosphor target or screen formed on the inner surface of the CRT faceplate that is scanned in a single direction by an electron beam emanating from an electron gun positioned in the neck of the CRT. Beam travel in conventional scanning is horizontally across the target from left to right when viewed from the front of the CRT. Each scan line consists of a relatively high speed horizontal trace during which video information is displayed, followed by a higher speed retrace, in which no video is displayed. Simultaneously, a vertical low speed deflection voltage is continuously applied which causes each scan line to slope downwardly under its influence. After each vertical field a high speed vertical retrace voltage returns the electron beam to its starting point and the process is repeated. Two sawtooth waveforms of current passing through horizontal and vertical yoke deflection coils, positioned on the neck of the CRT, accomplish beam deflection. In a conventional television raster scan system, the horizontal deflection frequency is 15.72 KHz and the vertical deflection frequency is 60 Hz.

Retracing the electron beam after each horizontal scan is wasteful of approximately 20% of the horizontal scanning time and, of course, produces no video information. Of even more interest is the voltage stress placed upon the horizontal output circuit components by the retrace pulse. The pulse voltage approximates ten times the normal DC operating voltage supply for the system. This stress on the circuit components places a practical limit on scanning speed. For this reason bi-directional scanning systems have been proposed. "Symmetric Time Deflection for Colour T.V. Receivers with Enhanced Picture Quality", by Uwe E. Kraus, 1985 IEEE International Conference on Consumer Electronics (ICCE).

In a bi-directional scanning system for a CRT, the horizontal retrace time is eliminated. This is accomplished by providing "symmetrical sawtooth" current in the horizontal or high frequency deflection coils for scanning in both directions horizontally and a "staircase" current in the vertical or low frequency coils for vertical deflection at the end of each horizontal scan line. The resolution of the display is only limited by the spot size of the CRT electron beam.

For a bi-directional scanning system, a highly symmetrical deflection waveform is required. For a sinusoidal deflection waveform, this corresponds directly to percentage of harmonic distortion. A linear deflection amplifier can meet distortion specifications; however, it is considered not to be a competitive amplifier since the power dissipation is much greater than the conventional saw-tooth amplifier. What is needed is an economical and efficient amplifier for driving a horizontal deflection coil of a bi-directional scanning system to produce a high resolution CRT display.

Objects of the Invention

Accordingly, a principal object of the present invention is to provide a unique CRT scanning system.

A further object of the invention is to provide an efficient scanning system that also has a higher resolution capability.

Another object of the invention is to provide a CRT scanning system that minimizes voltage stress on the scanning circuit components.

A still further object of the invention is to provide an economical bi-directional scanning system.

Yet another object of the present invention is to disclose a scanning system having a switchmode amplifier which operates at high frequency with low harmonic distortion and is especially suited for use in a high resolution computer or television display.

Numerous other advantages and features of the present invention will become readily apparent from the following detailed description of the invention, the embodiment described therein, from the claims, and from the accompanying drawings.

Brief Description of the Drawings

FIGS. 5A-5H depict the waveforms related to the scanning system of the invention as shown in FIG. 3.

Description of the Preferred Embodiment

Figure 1:
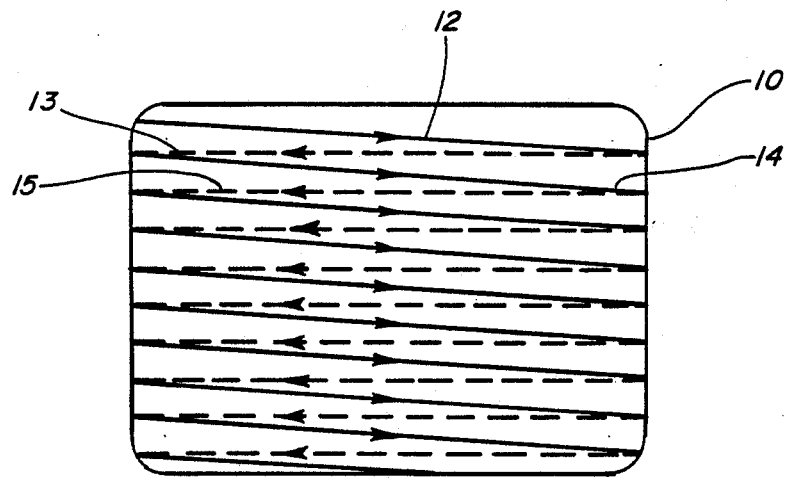
FIG. 1 is a simplified view of the faceplate of a conventional CRT with a small number of horizontal scan lines illustrated.

While this invention is susceptible of embodiment in many different forms, there is shown in the drawings and will herein be described in detail one specific embodiment of the invention. It should be understood, however, that the present disclosure is to be considered an exemplification of the principles of the invention and is not intended to limit the invention to the specific embodiment illustrated.

Throughout the discussion which follows, it should be understood that the terms "switch", "capacitor" and "inductor" are used in the functional sense and not exclusively with reference to specific solid-state components, mechanical equivalents, discrete components, or winding arrangements. Similarly, the terms "horizontal" and "vertical" are for used convenience only and the scanning system of the invention is not to be restricted to operation in any particular direction.

Turning to FIG. 1, a CRT faceplate 10 is illustrated with a number of solid-line horizontal scans and dashed-line retraces shown thereon. It will be appreciated that the number of line scans and retraces is much greater than illustrated, a lesser number being selected to more clearly illustrate those aspects of prior art scanning systems that are pertinent to the invention. An initial scan 12 traverses from left to right across the faceplate 10 in a slightly downward direction. The arrowheads indicate the direction of the scan and retrace. When the faceplate has been traversed by the scan 12, the CRT electron beam is rapidly returned (i.e., horizontal retrace) to the left side of the faceplate, as illustrated by dashed line 13. Because of the simultaneous operation of a vertical scanning circuit, the starting point of the next scan 14 is vertically displaced from that of the first scan 12. It will also be noted that the higher speed of the electron beam during retrace, as illustrated by dashed lines 13 and 15, results in greater vertical displacement of the electron beam during a scan than during a retrace. Conventional CRT scanning systems in use today operate substantially in this manner.

Figure 2:
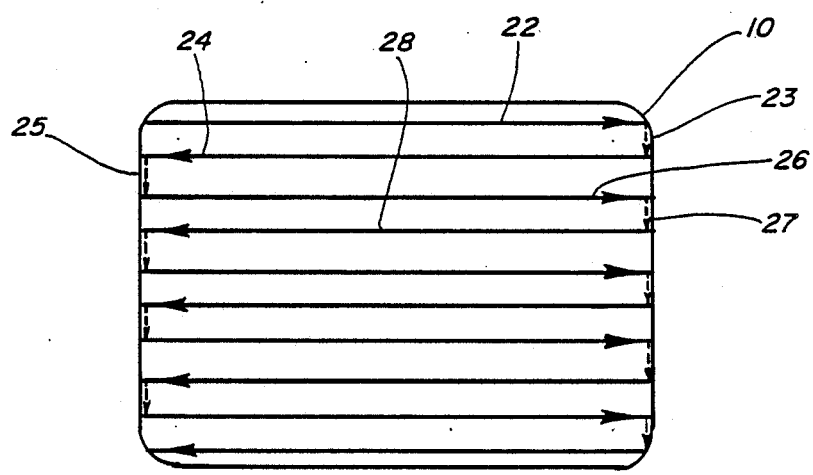
FIG. 2 is a similar simplified view of the faceplate of a CRT operated with the bi-directional scanning system of the present invention.

In FIG. 2, a similar CRT faceplate 10 is shown in conjunction with the scanning system of the present invention. In particular, the initial scan, noted as solid-line 22, is directed horizontally across faceplate 10. When the electron beam reaches the right side of the faceplate, it is deflected downwardly as illustrated by dashed line 23, the electron beam is then caused to make a return scan, in the opposite direction, horizontally across the faceplate, as illustrated by solid line 24. Upon reaching the left side of the CRT faceplate, the electron beam is again deflected downwardly, as illustrated by dashed line 25, and horizontally, as illustrated by scan line 26, from left to right. At the right side of the CRT another downward deflection, illustrated by dashed line 27, is made and the beam makes a return scan from right to left, as illustrated by solid-line 28. This procedure is continued to completely scan the CRT screen. It is apparent that there is no horizontal retrace of the electron beam as in the prior art. Rather, scanning occurs in both left-to-right and right-to-left directions across the faceplate Further, each scan is horizontally disposed on the CRT faceplate, that is, there is no change in vertical deflection during a scan.

Figure 3:
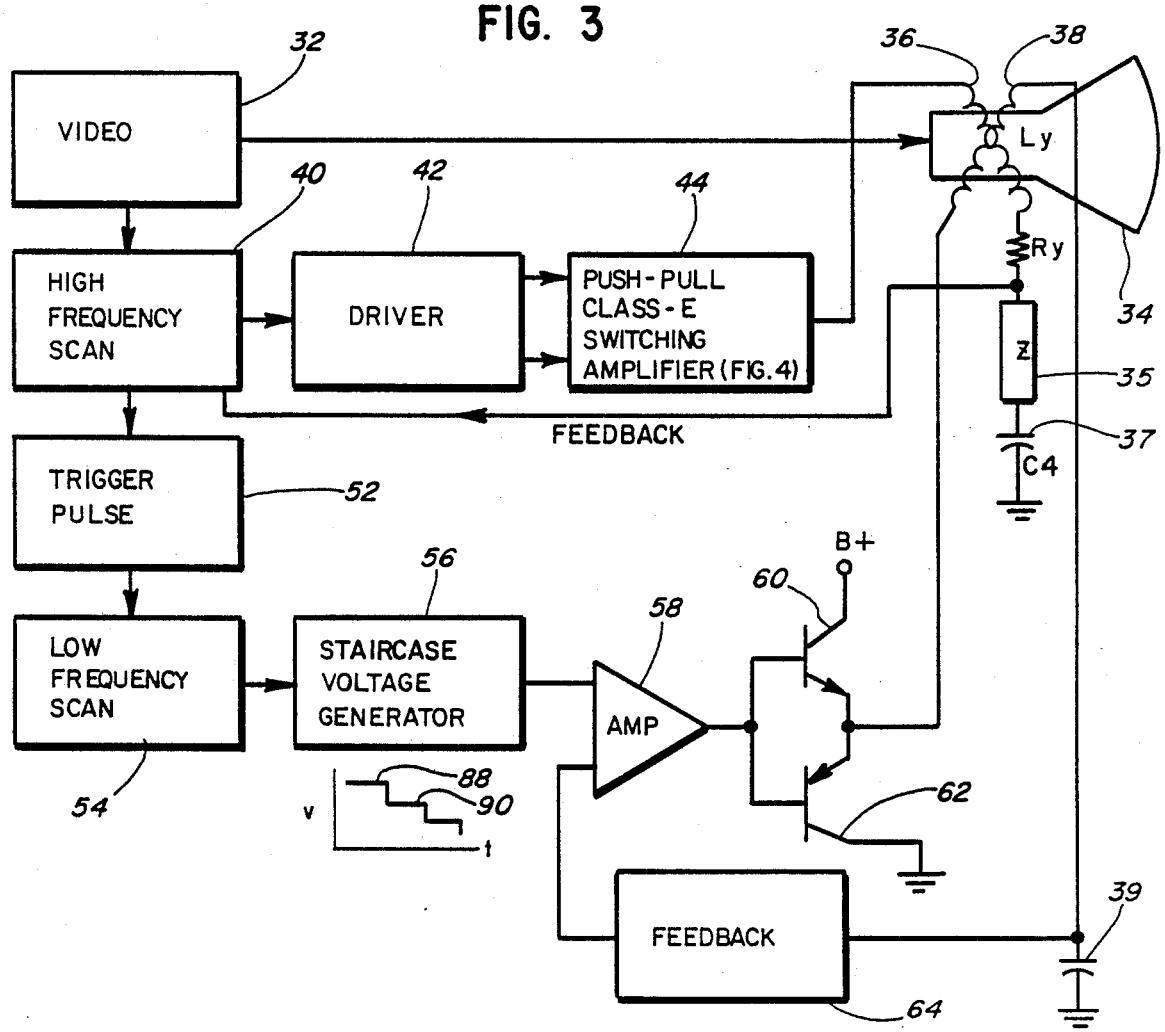
FIG. 3 is a block diagram of a scanning system constructed in accordance with the present invention.

The circuitry for accomplishing the bi-directional scanning of FIG. 2 is depicted in FIG. 3. In FIG. 3, a video circuit 32 supplies appropriate electron gun elements in the neck of the CRT 34 with video information. A horizontal deflection coil 36 and a vertical deflection coil 38, both of conventional design, are positioned on the neck of the CRT in accordance with common practice.

A high frequency scanning circuit 40 is coupled to video circuit 32 for synchronizing the release of video information to the CRT with the beginning of each horizontal scan. The high frequency scanning circuit 40 is coupled to a driver circuit 42 which is schematically indicated as controlling a push-pull class-E switching amplifier 44 (See FIG. 4). The amplifier 44 is connected to one end of a horizontal deflection coil 36. Switches S1 and S2 (See FIG. 4) in the amplifier 44 are operated by driver circuit 42. Commutating diodes may be connected across the two switches to avoid against inverted operation.

The other end of the horizontal deflection coil 36 is coupled, through a coil or resistor 35 for current phase sensing, to a resonant capacitor 37. Operation of driver circuit 42, under the control of the high frequency scanning circuit 40, produces a generally sinusoidal current (See FIG. 5H) in horizontal deflection coil 36. The waveshape is symmetrical and has equal rise and fall portions (i.e., equal and opposite slopes and magnitudes to provide linear forward and reverse scanning of the electron beam across the CRT faceplate).

The high frequency scanning circuit 40 also provides a control signal to a trigger pulse circuit 52 which, in turn, is coupled to a low frequency scanning circuit 54. Initiation of the low frequency scanning circuit 54 is controlled by pulses from trigger pulse circuit 52 for the purposes of synchronization of its output with the high frequency scanning circuit 40. The oscillatory output of the low frequency scanning circuit 54 is coupled to a "staircase" voltage generator 56 which may take any of a number of well-known forms. For example, in one configuration, staircase voltage generator 56 may comprise a simple counter circuit for developing a plurality of discrete counts or voltage levels for each oscillation of the low frequency scanning circuit 54. The output of staircase voltage generator 56 is supplied to one input of an operational amplifier 58, the output of which is coupled to a pair of push-pull connected output transistors 60 and 62 which are connected to one end of vertical deflection coil 38, the other end of which is coupled to a conventional electrolytic capacitor 39. The junction of this capacitor 39 and the vertical deflection coil 38 is coupled through a conventional vertical feedback circuit 64 to the other input of the operational amplifier 58. This arrangement of elements provides uniformly spaced and stabilized, linear current increments through vertical deflection coil 38 with each level of current being determined by the output of staircase voltage generator 56.

It will be appreciated that video circuit 32 may comprise any source of data to be displayed with suitable attention being paid to the bi-directionality of the scan and the lack of retrace. As a consequence of this scanning scheme a time inversion of the video information of every second line is necessary. This can be carried out by serial line memories featuring opposite shift directions. A picture memory may fulfil this task as well.

A class-E switching-amplifier is a high efficiency, high frequency power amplifier. The basic characteristics of Class E operation is disclosed and discussed in U.S. Pats. Nos. 3,919,656 and 4,607,323 to Sokal et al. Generally, speaking a class-E amplifier comprises a switching device, such as a transistor with parasitic capacitance, and a reactive load circuit which adjusts the phase of the voltage and currents to obtain high efficiency. Specifically, the load is adjusted to have the voltage across the semiconductor switching device go to zero with zero slope before it switches "on" and passes current. High efficiency is achieved by shaping the waveforms of the switch voltage and the switch current so that the transitions of those two waveforms are displaced in time from each other. Then the switching device does not experience simultaneous high voltage and high current while switching. A class-E switch mode amplifier achieves high efficiency at high frequencies by essentially eliminating the cause of the switching power dissipation which exists in almost all present-day switch-mode power converters, including DC to RF power inverters (i.e., the simultaneous occurrence of high voltage across and high current through the switching device, during the times that the switching device is making its transitions between the "on" and "off" state).

Figure 4:
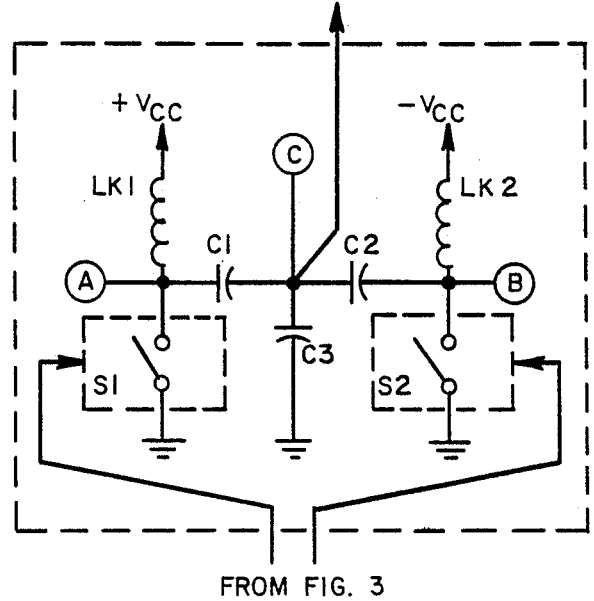
FIG. 4 is a schematic diagram of the push-pull switching amplifier in FIG. 3.

Turning to FIG. 4, a schematic diagram of the push-pull class-E switching amplifier 44 of FIG. 3 is illustrated. Specifically, the amplifier 44 comprises a first switching device S1 which has an input terminal coupled to a shunt feed $L_{k1}$ which is connected to a source of positive DC power +Vcc, a second switching device S2 which has a input terminal coupled to another shunt feed inductor $L_{k2}$ which is connected to a negative source of DC power −Vcc, and a capacitor matching network. Here, the capacitor matching network comprises a ground connected capacitor C3 which joins a common node "C" to ground, another capacitor C1 which joins the output "A" of the first switching device S1 to the common node "C", and still another capacitor C2 which joins the output "B" of the second switching device S2 to the common node "C". The common node "C" is joined to one end of the horizontal deflection coil 36, such that the ground connected capacitor C3 is in parallel with the horizontal deflection coil 36 and its associated components $R_y$, 35 and 37. The network of capacitors C1, C2, and C3, inductors $L_{k1}$ and $L_{k2}$, and the horizontal deflection coil 36 and its components $R_y$, 35 and 37 shape the waveforms of the switching voltages and the switching currents of the first and second switching devices S1 and S2 to have the transitions of those two waveforms displaced in time from each other and to have each of the switching devices not experience simultaneously high current and high voltage while switching. This concept is best illustrated with reference to FIG. 5.

Referring to FIG. 5, the two switching devices S1 and S2 are gated by the driver circuit 42, such that the two switches S1 and S2 have the same high frequency switching rate with one of the switches gated "on" during the time interval when the other switch is in its "off" condition. Here, the second switching device S2 is gated "on" (See FIG. 5E) when the first switching device S1 is "off" (See FIG. 5A) and after the first switching device has been in its "off" condition for a period of time approximately equal to the period in which the first switching device was in its "on" condition.

When the first switching device S1 closes or is gated "on" the current flow through the switch rises as illustrated in FIG. 5C. By virtue of the characteristics of a class-E amplifier, the first switching device has a voltage at its output node "A" which stays flat (See FIG. 5B), and the second switching device S2 being in its "off" condition, has the voltage at its output node "B" at its maximum negative value (See FIG. 5F) with no current flow (See FIG. 5G). Simultaneously, the voltage at the common capacitor node "C" increases from a maximum negative value (See FIG. 5D) and returns to zero.

After the first switching device S1 is gated "off", its current drops to zero (See FIG. 5C). Thereafter, the voltage at the output "A" of the first switching devices rises (See FIG. 5B). The current through the yoke (See FIG. 5H), after decreasing while the first switching device S1 was gated "on", increases generally sinusoidally from its maximum negative value to zero. Since the capacitors C1, C2, and C3 shape the waveforms of the switching voltages and the switching current, the voltage at the output "B" of the second switching device S2, after ringing, returns to zero at zero slope before the second switching device is gated "on" or closed (See FIG. 5F). This ringing action takes place as energy is interchanged between the capacitors and the tuned circuit formed by the horizontal deflection coil 36 and its associated components $R_y$, 35 and 37, which resonates.

After the second switching device S2 is gated "on", the waveforms across the components act much as that following the gating of the first switching device S1. Specifically, the current through the second switching device S2 rises from zero to a maximum negative value (See FIG. 5G), the voltage at the common capacitor node "C" goes from its maximum positive value to zero (See FIG. 5D) and the current through the yoke increases from zero to its maximum positive value (See FIG. 5H).

After the second switching device S2 is gated "off", the voltage at the output "A" of the first switching device S1 drops to zero with zero slope (See FIG. 5B) before the first switching device is gated "on" for the next cycle of operation. Finally, the voltage at the common capacitor node "C" drops from zero to its maximum negative value (See FIG. 5D), and the current through the yoke (See FIG. 5H) decreases sinusoidally from its maximum positive value to zero.

The zero line in FIG. 5H corresponds to the central vertical axis of the CRT faceplate, the negative peaks correspond to the left-hand side and the positive peaks correspond to the right-hand side. Preferably, the three capacitors C1, C2, and C3 are equal to achieve a balanced condition for reduced harmonic distortion. The two switching devices, S1 and S2, are preferably semiconductors, such as Field Effect Transistors (FET's). A prototype circuit 44 was demonstrated with the two switching devices S1 and S2 operated at 32 KHz.

The current at the output of the staircase voltage generator 56 (See FIG. 3) results in a staircase current having a high step 88, followed by an adjacent lower step 90, and so on, for controlling the vertical position of the electron beam over the entire CRT faceplate (See FIG. 2). When yoke current corresponding to the first half-cycle 84 (See FIG. 5H) flows in the horizontal deflection coil 36, the current in the vertical deflection coil 38 is at level or step 88. Since this level is held constant during the scan, there is no vertical change (See FIG. 2). During the reverse scan, the horizontal deflection coil current corresponds to second half-cycle 86 of the yoke current and the vertical deflection coil current is at level 90, indicating that the electron beam is displaced downwardly a small distance. This continues throughout scanning of the CRT face.

Thus, it will be seen that the scanning system of the invention scans the electron beam from left-to-right and from right-to-left, with vertical deflection occurring in discrete increments at the end of each scan. Moreover, the scan frequency may be many times greater than those currently in use without increasing the voltage stress on the scanning components. It should be noted however, that a class-E amplifier, while having the advantages of reduced harmonic distortion and lower cost (relative to a linear deflection amplifier), may require additional image distortion correction circuitry due to any non-symmetry in the deflection waveform.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. For example, equivalent elements may be substituted for those illustrated and described herein and parts may be reversed. Thus, the CRT target may be vertically scanned, if desired. Moreover certain features of the invention may be utilized independently of other features of the invention. For example, the unique push-pull class-E amplifying circuit of FIG. 4, may be used as a convenient source of low harmonic bi-directional current flow as a DC to RF converter. Thus, it will be appreciated that various modifications, alternatives, variations, etc., may be made without departing from the spirit and scope of the invention as defined in the appended claims. It is, of course, intended to cover by the appended claims all such modifications as fall within the scope of the claims.

What is claimed is:

1. A scanning system for CRT horizontal deflection coil means which has an input terminal and a ground terminal, comprising:
   (a) means for receiving a positive DC power input;
   (b) a first switching device which has an input terminal coupled to said means for receiving a positive DC power input and which has an output terminal, said first switching device having a switching cycle which is characterized by an on-interval followed by an off-interval;
   (c) means for receiving a negative DC power input;
   (d) a second switching device which has an input terminal coupled to said means for receiving a negative DC power input and which has an output terminal, said second switching device having a switching cycle which is generally the same as said switching cycle of said first switching device with the on-interval of said second switching device occurring during the off-interval of said first switching device; and
   (e) matching network means, inter-coupling the input terminal of the CRT deflection coil means and said output terminal of said first switching device and said output terminal of said second switching device, for shaping the waveforms of the switch voltage and the switch current of said first switching device and said second switching device to have the transitions of those two waveforms for each of said switching devices displaced in time from each other and to have each of said switching devices not experience simultaneously high current and high voltage while switching.

2. The system of claim 1, wherein said matching network means comprises:
   (1) first capacitor means for joining the input terminal of the CRT deflection coil means to ground;
   (2) second capacitor means for joining the input terminal of the CRT deflection coil means to said output terminal of said first switching device; and
   (3) third capacitor means for joining the input terminal of the CRT deflection coil means to said output terminal of said second switching device.

3. The system of claim 2, wherein said first capacitor means and said second capacitor means and said third capacitor means are capacitors having generally the same value of capacitance.

4. The system of claim 1, wherein the CRT deflection coil means comprises a series RLC circuit which is adapted to be mounted on a CRT to cause horizontal movement of an electron beam.

5. The system of claim 1, wherein said switching cycle is characterized by an on-interval followed by an off-interval which is about three times as long as said on-interval.

6. The system of claim 1, wherein said second switching device has an on-interval which begins after said first switching device has been off for a time period which is about equal to twice the on-interval of said first switching device.

7. The system of claim wherein said second switching device has an on-interval which begins after said first switching device has been off, at least as long as said first switching device was on.

8. The system of claim 1, wherein said off-interval is at least three times as long as said on-interval.

9. A bi-directional deflection circuit, comprising:
   (a) a load impedance which includes means for producing horizontal deflection on a CRT;
   (b) a first class-E switchmode means, including a first semi-conductor which is operated at a switch frequency and which is coupled to a positive dc power input, for producing at an output terminal a switch voltage which goes to zero with a zero slope before said first semi-conductor turns on and passes current when said load impedance is connected at its output to have an impedance value within a predetermined range of zero to slightly higher than a nominal load impedance value; and
   (c) a second class-E switchmode means, including a second semi-conductor which is operated at said switch frequency and which is coupled to a negative dc power input, for producing at an output terminal a switch voltage which goes to zero with a zero slope before said second semiconductor turns on and passes current when said load impedance is connected at its output terminal to have an impedance value within a predetermined range of zero to slightly higher than a nominal load impedance value, said second switch having an on-interval which occurs during the off-interval of said first switch.

10. The circuit of claim 9, wherein said means for producing horizontal deflection on a CRT includes horizontal yoke means and capacitor means in series with said yoke means.

11. The circuit of claim 10, wherein said load impedance comprises capacitor means for transforming the input impedance of said horizontal yoke means to present a load impedance within said predetermined range to said outputs of said first and said second class-E switchmode means.

12. The circuit of claim 10, further including means for producing a vertical deflection on a CRT using a staircase voltage which is synchronized with the operation of said first and second class-E switchmode amplifier means.

13. A bi-directional deflection circuit, comprising:
   (a) first DC/AC converter means, operating at a high switching frequency, for operating a first switch to convert a source of positive high voltage DC power to an AC voltage output drive CRT deflection means and move an electron beam in one direction across the face of a CRT without the occurrence of high voltage across said first switch and high current through said first switch during the time that said first switch is making its transitions between its "on" and "off" states; and
   (b) second DC/AC converter means, operating at said high frequency and out of phase with said first DC/AC converter means, for operating a second switch to convert a source of negative high voltage DC power to an AC voltage output to drive said CRT deflection means and move said electron beam in an opposite direction across said face of the CRT without the occurrence of high voltage across a second switch and high current through said second switch during the time that said second switch is making its transitions between an "on" and "off" states.

14. The circuit of claim 13, wherein said second switch has an on-interval which begins after said first switch has been off for a time period which is about equal to the on-interval of said first switch.

15. The circuit of claim 13, wherein said CRT deflection means comprises:
(a) capacitor means joining a common node to a ground reference and to said AC voltage output of said first and said second DC/AC converter means; and
(b) series circuit means, including inductance and a resistance and a capacitance, for joining said common node to said ground reference.

16. A scanning circuit of the tuned switching type for the high-efficiency generation of an alternating-current waveform, comprising:
(a) a first active device switch having a low-impedance "on" state and a high-impedance "off" state;
(b) a second active device switch having a low-impedance "on" state and a high-impedance "off" state;
(c) driver means for causing said first and said second switch to commute periodically between said two states, at the same frequency and out of phase with each other;
(d) a load network having an input and an output, said input being connected to said first switch and said second switch;
(e) means for supplying positive DC power to the series combination on said first switch and said load network input, said load network including a first inductive element that is located in the DC path which extends to said first switch from said means for supplying positive DC power;
(f) means for supplying negative DC power to the series combination on said second switch and said load network input, said load network including a second inductive element that is located in the DC path which extends to said second switch from said means for supplying negative DC power; and
(g) CRT deflection coil means coupled to said output of said load network, the values across said first switch and said second switch of said CRT deflection coil means and the load network being such that:
the voltage across said first and said second switches is substantially zero at the end of their "off" state;
the voltage across said first and said second switches is substantially zero during the time said first and said second switches are in transition from the "off" state to their "on" state, and
the time derivative of the voltaqe across said first and said second switches are substantially zero at the end of their "off" state.

17. The circuit of claim 16, wherein said load network includes a plurality of capacitors whose capacitive reactance at said frequency are appreciable.

18. A system for scanning an electron beam in a CRT, comprising:
first coil means for being carried by the CRT;
first class-E amplifier means for supplying current to said first coil means to move the electron beam to scan across the face of the CRT in a first direction;
second class-E amplifier means for supplying current to said first coil means to move the electron beam to scan across said face of the CRT in a second direction which is opposite to said first direction; and
displacement means for moving said electron beam in a direction generally orthogonal to said first and said second direction at the end of each said scan.

19. The system of claim 18, wherein said displacement means comprises:
second coil means for being carried by the CRT; and
step voltage generator means for incrementally displacing said electron beam in said orthogonal direction at the end of each said scan and for maintaining said beam in a relatively constant orthogonal position during each said scan.

20. The system of claim 18, wherein said first class-E amplifier means and said second class-E amplifier means are operated by a driver which is controlled by a high frequency scanning circuit; and further including video means for supplying video data to said electron beam under control of said high frequency scanning circuit.

21. A high speed scanning system for a CRT having an electron beam for scanning a phosphor target, comprising:
a horizontal deflection coil and a vertical deflection coil which are adapted to be carried by the CRT;
high frequency driver means;
high frequency switch means, coupled between said high frequency driver means and said horizontal deflection coil, for developing a generally sinusoidal current in said horizontal deflection coil using a positive and negative source of HVDC current and two switches which are operated to have zero voltage across said two switches at the end of their off-state and to have the time derivative of the voltage across said two switches substantially equal to zero at the end of their off-state;
means for producing a staircase current through said vertical deflection coil;
feedback means for maintaining different constant current levels in said vertical deflection coil for each horizontal scan and for downwardly displacing the electron beam an incremental amount at the end of each horizontal scan; and
means, operating in synchronism with each horizontal scan, for supplying video information for display to the electron beam.

22. A bi-directional scanning circuit for a CRT, comprising:
(a) CRT deflection coil means; and
(b) a push-pull class-E switchmode amplifier having a switch which is operatively connected to a positive HVDC input, having a switch which operatively connected to a negative HVDC input, and having an output which is connected to supply current to said CRT deflection coil means.

* * * * *